Patented June 26, 1934

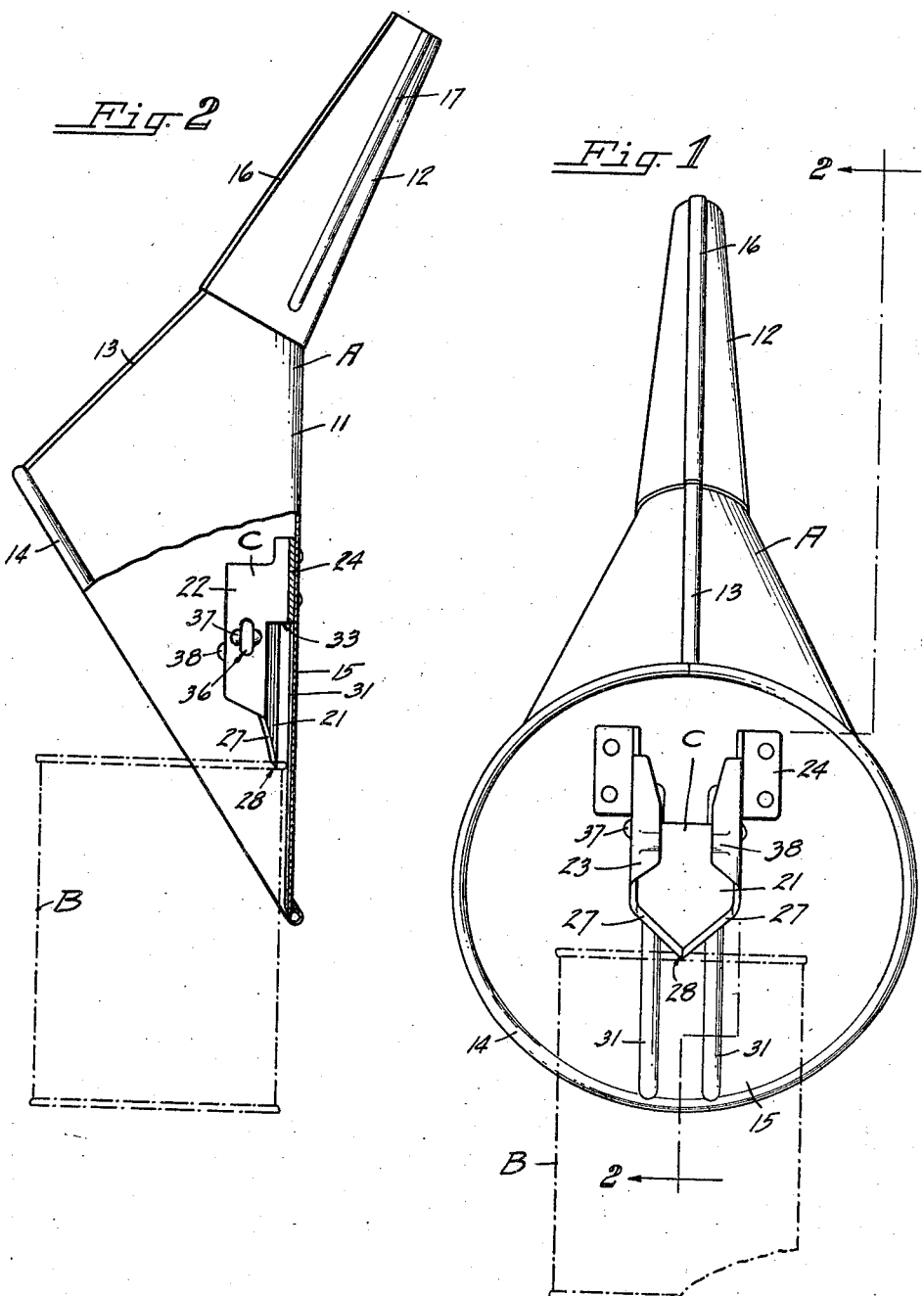

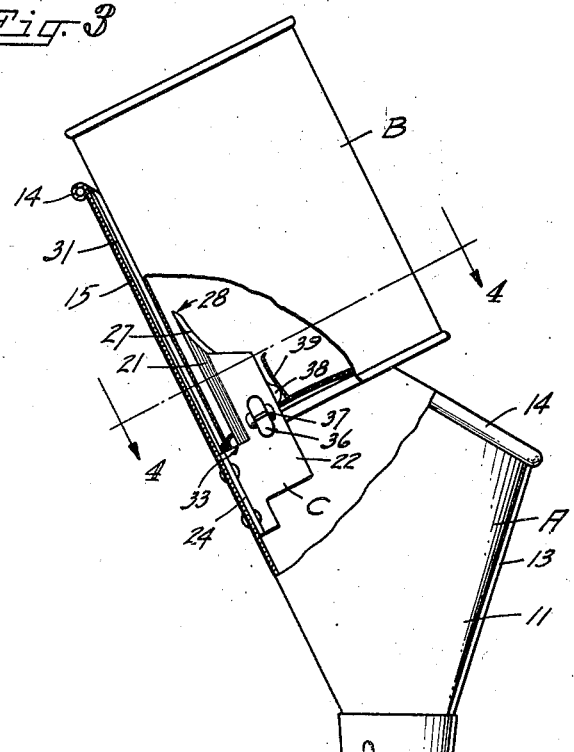
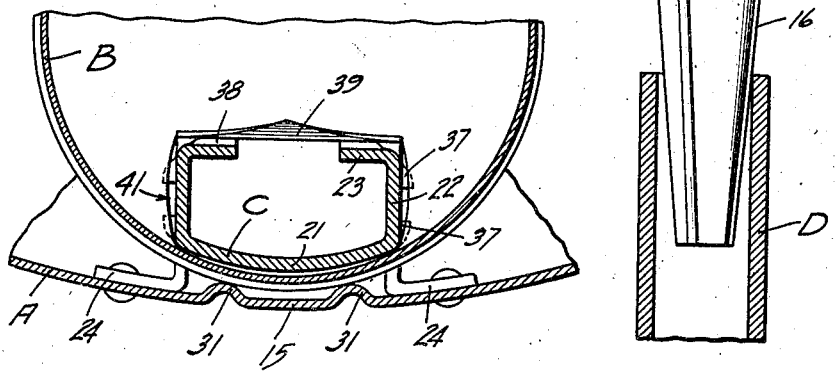

1,964,644

UNITED STATES PATENT OFFICE 1,964,644

LIQUID DISPENSING DEVICE

Elmer L. Nall, Wheaton, Ill.

Application July 20, 1933, Serial No. 681,355

10 Claims. (Cl. 221—23)

The present invention relates to liquid dispensing funnels which are cut away on or are formed with an open side and equipped with opening elements which function to cut into and open sealed liquid containing receptacles as funnel and receptacle are brought together, the liquid contents of the receptacle draining into and passing through the funnel as the latter is used in its dispensing capacity, the receptacle, cutter and funnel parts which cooperate in the opening, draining and dispensing actions being visible and unobstructed from view by reason of such open side construction of the funnel wall.

The invention contemplates a funnel for opening sealed receptacles and dispensing liquids such as lubricating oil therefrom which is used in its dual capacity of opening and dispensing with ease and precision and one in which different relative positions of receptacle and funnel may be observed at all stages of being brought together in the opening of the receptacle and one in which the passage of the oil through the funnel at any stage of its flow may also be observed to the end that better control of opening and dispensing actions may be obtained.

An important object of the invention is the provision of a funnel capable of receiving, opening and dispensing liquids from a sealed receptacle without obstructing the view of the receptacle wall being opened nor the flow of its liquid contents out of the opening in its wall.

A further important object of the invention is the provision of a conical or cylindrical funnel formed with a seat in one side of its conical or curved wall which is adapted to receive a sealed receptacle in a certain position while opening it, and which is also adapted to hold it there while dispensing its liquid contents, the inside of the funnel being exposed to view during both actions.

An important object of the invention is the provision of a cutter in a combination opening and dispensing funnel which turns back the receptacle wall adjacent its opening so that the cutter may be more easily removed from the receptacle after the dispensing action.

Numerous other objects and advantages of the invention will be apparent as it is better understood from the following description, which taken in connection with the accompanying drawings, discloses a preferred embodiment thereof.

Referring to the drawings:

Figure 1 is a side elevation of a funnel embodying the present invention, this view illustrating the funnel in its inverted position and looking into its open face, the outline of a receptacle in proper position for opening being indicated by dot and dash lines;

Fig. 2 is a combination side elevation and longitudinal section of the funnel, also showing by dot and dash lines the receptacle in the same position, this figure being viewed substantially along the broken line 2—2 in Fig. 1;

Fig. 3 is a view similar to Fig. 2 but illustrating a receptacle in opened position within the funnel, the latter being held in its dispensing position, being turned over from the position assumed in Figs. 1 and 2; and Fig. 4 is an enlarged fragmentary sectional view taken substantially along the line 4—4 in Fig. 3.

The funnel illustrated in the drawings and designated by the letter A is adapted to receive a sealed receptacle B holding a liquid to be dispensed such as automobile oil or the like. A cutter C secured in the interior of the funnel A is utilized for opening the receptacle B as cutter and funnel are brought together. After the receptacle B is opened by the cutter C its liquid contents emptying from the receptacle flows around the cutter through the body of the funnel and into a suitable place of deposit, graphically illustrated in Fig. 3, which in the case of lubricating oil may be the receiving neck D of the crank case of an automobile.

The funnel A comprises a body 11 which is preferably conical in shape and which is connected with a dispensing spout 12. The open or receiving end of the body 11 opposite the spout 12 is cut away along one side which may be adjacent a side seam 13 for example, this open mouth being surrounded by a continuous curled edge 14 which extends at an angle to the funnel body providing a short or narrow side wall section along its side seam 13 and a long or wider section 15 directly opposite.

The dispensing spout 12 may be also formed with a side seam 16 and with longitudinal projecting ribs 17 used for venting the discharge spout end 12 on the funnel when it is inserted in an automobile crank case neck D or other place of deposit.

The cutter C is formed with a circular wall 21 (Figs. 3 and 4) which merges into parallel side walls 22 that are again bent inwardly at 23. The side walls 22 merge at one end of the cutter in supporting feet 24 and these feet are riveted to or otherwise secured in the funnel body 11. This cutter is fixed on the long side 15 of the funnel body and is disposed substantially midway between its outer curled edge 14 and its inner connection with the dispensing spout 12.

The cutter wall 21 at the end opposite the feet 24 is sharpened and formed into triangular edges 27 which merge at the wall center into a piercing point 28. The sharpened edges also extend along the edges of the side walls 22. The body wall 11 of the funnel along its long section 15 is pressed inwardly to provide parallel ridges 31 (Figs. 1 and 4) and these ridges extend between the feet 24 of the cutter passing adjacent to but spaced from the cutter wall 21.

The sealed receptacle B may be inserted into the funnel A when the latter is in dispensing position as illustrated in Fig. 3, or it may be inverted over the receptacle B as the latter rests in an upright position. If received into the position illustrated in Fig. 3 it is necessary to support the funnel A in any suitable way, as by holding it in one hand, while the receptacle B is moved down along the wide wall section 15.

The receptacle in this movement rests on or against the parallel ridges 31 while being forced downwardly on to the cutter C. As soon as the end of the receptacle is punctured by the cutter point 28 and the sharpened cutter edges 27 have entered into the receptacle wall the liquid contents flow down inside the wall of the funnel and out through the dispensing spout 12.

It is often preferable, however, to first open the sealed receptacle by inverting the funnel and placing it on the receptacle as illustrated in Figs. 1 and 2 and thence move the funnel downwardly while inserting the cutter into the top wall of the receptacle. For such an opening operation the funnel is positioned so that its parallel ridges 31 engage the rim or seam of receptacle B as shown in Fig. 2 and with the long side 15 of the funnel body in a vertical position.

In this position the cutter piercing point 28 rests on the top wall of the receptacle and as soon as the funnel is moved downwardly with its wall part 15 moving substantially parallel to the side wall of the receptacle, this piercing point passes into the receptacle wall followed by the sharpened cutting edges 27.

The wall 21 and the adjacent parts of the walls 22 and 23 of the cutter pass substantially into the receptacle, this movement being stopped by shoulders 33 (Fig. 2) coming down upon the top rim of the receptacle. These shoulders 33 are formed by the juncture of the feet 24 with the side walls 22, as best shown in Figs. 2 and 3. The interior of the cutter is vented during this movement. The side walls 22 are slotted at 36 one end of each slot being even with its adjacent shoulder 33 so that as the cutter is being inserted in the receptacle B air passes freely through the sides to replace the oil flowing from the receptacle.

The side walls 22 are also formed with projections 37 (Figs. 1 and 2) preferably located adjacent the vent slots 36 and the walls 23 are formed with similar projections 38. As the receptacle wall is cut by the sharpened edges 27 as the cutter enters into the receptacle the angular position of side wall cutting edges is such as to turn back the cut wall, as best illustrated in Fig. 3 and this wall movement is further accentuated by the projections 38 wedging in against the turned back tab as at 39.

In a similar manner side edges of the opening being made by the entering cutter are forced back (as at 41, Fig. 4) by the wedging action of the projections 37. As only a small contact surface is made between the turned back receptacle walls and the projections 37, 38, the opened receptacle is not jammed on the cutter so tightly but the receptacle and cutter may be easily separated after the dispensing action when the empty receptacle is cast away from the funnel.

It will be observed by reference to Figs. 1 and 2 that, throughout the positioning of the funnel on the receptacle (Figs. 1 and 2) and after the funnel has been pushed down and the cutter inserted into the receptacle, the open face of the funnel body which is surrounded by the edge 14, permits full inspection of the top wall of the receptacle and the cutter. In other words, these parts are open to view, first when the funnel rests in its initial position, and that part of the cutter extending above the receptacle wall is in plain sight during passage of the cutter into the receptacle.

This is made possible by reason of the cut-away construction of this open end of the funnel, the short side 13 of the funnel body 11 allowing for its section of the edge 14 which is along the top of the funnel in such inverted position, to be placed sufficiently far above the top of the receptacle B to allow for this full inspection.

It will also be observed by reference to Fig. 3 that during the dispensing of the liquid from the cutter B and during its flow through the funnel A the stream of liquid passing down along the long side of the funnel body is visible over the rim 14 of the open mouth of the funnel and under the end of the receptacle from which the liquid issues. This open construction and the unobstructed view made possible by it permits full control of the opening of the receptacle as it is forced down on the cutter. Regardless of when and how the receptacle is opened the dispensing of the liquid through the funnel can be made.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A liquid dispensing funnel comprising, in combination, a body having a wall long on one side and short on the other and adapted to receive a sealed receptacle containing a liquid to be dispensed, and a cutter secured in said funnel body on its long side and adapted to enter and cut into the top of the receptacle during relative movement between cutter and receptacle to open the latter, the cutter and the receptacle wall cut thereby being visible between the funnel edge adjacent its short side and the receptacle during such movement.

2. A liquid dispensing funnel comprising, in combination, a funnel body having its top or receiving end disposed at an angle to provide a wide section and a narrow section wall, and a cutter secured inside of said body adjacent the wide section of its wall and adapted to open a sealed receptacle containing a liquid to be dispensed as receptacle and cutter are brought together to cause the latter to cut into a wall of the receptacle, said funnel body thereupon holding the open receptacle in liquid dispensing position while receiving the liquid from the receptacle and dispensing it through a discharging end of the funnel, the entering of the cutter into the receptacle wall during opening and the flow of the liquid from the receptacle into the funnel during dispensing being visible over the angular edge adjacent the narrow wall of said funnel body.

3. A liquid dispensing funnel comprising, in combination, a funnel body having its conical wall long on one side and short on the other and adapted to be inverted over and moved downwardly on a sealed receptacle containing a liquid to be dispensed, and a cutter secured in said funnel body on its long side and adapted to enter and cut into the top of the receptacle during the downward movement of the funnel to open the receptacle, the cutter and receptacle wall cut thereby being visible under the funnel edge adjacent its short side during such downward movement to permit more accurate control of the opening action.

4. A liquid dispensing funnel comprising, in combination, a funnel body having its conical wall long on one side and short on the other, and adapted to be inverted over and moved downwardly on a sealed receptacle containing a liquid to be dispensed, the edge along the short side remaining spaced above the top of the receptacle throughout the full movement, and a cutter secured in said funnel body on its long side and having a point of entrance adapted to rest on the top of said receptacle when the funnel is in initial inverted position, said cutter being forced into the receptacle wall by the downward movement of the funnel to open the receptacle, a spaced edge along the short side of the funnel being positioned far enough above the receptacle to allow for an unobstructed view of the said cutter, its entrance point and the receptacle wall during the placing of the cutter point into cutting position and during the subsequent cutting of the wall as the receptacle is opened.

5. A liquid dispensing funnel comprising, in combination, a funnel body cut away along one side and adapted to be inverted over and moved downwardly on a sealed receptacle containing a liquid to be dispensed, the side of said funnel body not cut away being held in a vertical position while moving downwardly alongside of and parallel to the side wall of said receptacle, and a cutter located inside of said funnel and secured to said vertical wall and having a downwardly extending cutting edge insertable into the top of said receptacle during the funnel movement to open the receptacle, said cutter holding the open receptacle adjacent and parallel to said body wall while funnel and receptacle are turned over and the liquid contents dispensed from said receptacle into said funnel and thence out of the funnel, the said cut away side of the funnel body exposing to view cutter and receptacle parts during the opening of the latter and also exposing to view the stream of liquid flowing through the funnel during its dispensing.

6. A fluid dispensing device comprising a body portion formed with an opening to receive a receptacle containing a fluid to be dispensed, discharge means associated with said body portion, and means associated with said body portion and angularly disposed in relation to the longitudinal axis thereof for opening said receptacle when received in said opening to dispense said fluid through said discharge means, said opening means having walls extending toward each other from the inner extremities of the opening means.

7. A fluid dispensing device comprising a body portion formed with an opening to receive a receptacle containing a fluid to be dispensed, means within said body portion for opening said receptacle when the same is angularly disposed relative to the longitudinal axis of said body portion whereby said receptacle is in an inclined position to effect a complete draining of the fluid through said opening, and means for discharging said fluid from said device, said opening means having walls extending toward each other from the inner extremities of the opening means.

8. A cutter for a dispensing device comprising a wall formed with a cutting edge, side walls extending therefrom, and protuberances on said side walls for deflecting cut portions of a receptacle and to permit easy removal of said cutter from said receptacle.

9. A liquid dispensing funnel comprising, in combination, a funnel body cut away along one side and exposed to view, inwardly projecting ridges located along the opposite side of said body, said body being adapted to receive a sealed receptacle containing a liquid to be dispensed, said receptacle as received resting against said ridges, and a cutter secured in the interior of said funnel body adjacent said ridges and also exposed to view from the side of the funnel and adapted to enter and cut into an engaged wall of said receptacle as it is received into said body, the liquid contents of said open receptacle draining into and passing from said funnel when funnel and receptacle are held in funnel dispensing position, the liquid stream being also exposed to view along the cut away side of said funnel body.

10. A liquid dispensing funnel comprising, in combination, a body having a wall long on one side and short on the other and adapted to receive a sealed receptacle containing a liquid to be dispensed, a cutter secured in said funnel body on its long side and adapted to enter and cut into the top of the receptacle during relative movement between cutter and receptacle to open the latter, the cutter and the receptacle wall cut thereby being visible between the funnel edge adjacent its short side and the receptacle during such movement, the cutter having projecting elements for bending back portions of the receptacle wall being opened so that the bent back walls and the cutter may be easily separated when the emptied receptacle is withdrawn from the funnel.

ELMER L. NALL.